United States Patent [19]
Beck

[11] Patent Number: 5,331,887
[45] Date of Patent: Jul. 26, 1994

[54] APPARATUS FOR EXTRACTING JUICE FROM FRUITS HAVING A RIND

[76] Inventor: James D. Beck, 1930 Kauai Pl., Costa Mesa, Calif. 92626

[21] Appl. No.: 813,535

[22] Filed: Dec. 26, 1991

[51] Int. Cl.[5] .............................................. A23N 1/02
[52] U.S. Cl. ........................................ 99/496; 99/495; 99/507; 100/52; 100/105; 100/108; 100/116; 100/269 R
[58] Field of Search ................ 99/496, 495, 509, 510, 99/506, 507; 100/37, 52, 105, 108, 107, 109, 110, 116, 213, 269 R

[56] References Cited

U.S. PATENT DOCUMENTS

| | | | |
|---|---|---|---|
| 1,939,757 | 12/1933 | Asher | 100/110 |
| 3,162,114 | 12/1964 | Quiroz | 100/108 |
| 3,682,092 | 8/1972 | Breton et al. | 100/52 |
| 3,717,084 | 2/1973 | Robbins et al. | 99/496 |
| 3,807,297 | 4/1974 | Marrie | 100/116 |
| 3,831,515 | 8/1974 | Breton et al. | 100/37 |
| 4,700,620 | 10/1987 | Cross | 99/510 |
| 4,768,430 | 9/1988 | Yamamoto et al. | 100/37 |
| 4,922,814 | 5/1990 | Anderson et al. | 99/495 |
| 5,001,911 | 3/1991 | Eck et al. | 100/116 |
| 5,035,174 | 7/1991 | Seal, Jr. | 99/495 |

FOREIGN PATENT DOCUMENTS

| | | | |
|---|---|---|---|
| 3230062 | 9/1988 | Japan | 99/510 |

Primary Examiner—Timothy F. Simone
Attorney, Agent, or Firm—Murphey Law Offices

[57] ABSTRACT

An apparatus for extracting the juice from whole fruit having a rind comprising axially aligned, spaced-apart piston and pressing head arranged to move reciprocally toward and away from each other, for loading a fruit therebetween, at least one perforated coring knife slidingly received in the pressing head for advancing into the fruit in preparation of collecting the extracted juice separate from the rind, and including an elastomeric head positioned over the front portion of the piston, defined by a circular concave portion centered over the piston and extending forward about its circumferencial edge an upstanding rim, and a skirt portion extending from the rim rearward along the outside of the piston to a terminal edge, wherein a ram, slidingly carried in the piston is hydraulically driven to advance beyond the piston to avert the center portion of the elastomeric head against the fruit during compression of the fruit between the ram and the pressing head, the improvement comprising at least one groove formed in the skirt portion of the elastomeric head beginning at the rim extending rearward along the outside of the skirt portion and terminating short of the terminal edge to provide an enclosed reservoir for receipt of peel oil expressed from the fruit during the squeezing operation for later disposal separate from the juice.

8 Claims, 2 Drawing Sheets

APPARATUS FOR EXTRACTING JUICE FROM FRUITS HAVING A RIND

BACKGROUND OF THE INVENTION

1. Field of the Invention

This invention pertains to the field of juice extraction machines. More particularly, it pertains to machines that extract juice from whole fruit that have rinds and to an improvement that results in greater separation of the peel oil or rind oil from the juice.

2. Description of the Prior Art

Fruit juices are available from various sources including fresh squeezed fruit and reconstituted fruit concentrates. Fresh squeezed fruit juice appears to offer an aroma and delicate taste generally not found in reconstituted juices and thus is in greater demand.

A problem with squeezing certain fruits is that their rinds or peels contain oil, known as "peel oil" that is often bitter and unpalatable. Where the oil is expressed from the rind during the squeezing process and allowed to mix with the juice, the result is often a bitter aftertaste in the juice that detracts from the overall taste and quality of the fresh juice.

To peel the fruit before squeezing it would remove the rind from the squeezing process; however, it would require substantial additional labor and raise the overall cost of producing the juice. Peeling has not been widely utilized because of the cost problem. To maintain a competitive price of the product, the juice is preferably extracted from whole fruit.

In our previously issued U.S. Pat. No. 3,831,515, we disclosed an apparatus and method for systematically loading and squeezing whole fruits having a rind, such as an orange, grapefruit, and the like, separating the expressed juice from the rind, and collecting the juice and rinds in separate containers while loading another fruit in the machine preparatory for the next squeezing operation. A specific feature of that patent is control of travel of the coring knife into the interior of the fruit, during the compression or squeezing step, short enough to prevent incising the other side of the fruit to assure extraction of juice through only one side of the fruit. This feature ensures sealing of the rind with the bottom of the ejector to avoid peel oil contamination in the extracted juice.

Over the years, the elastomeric piston shown in said patent has been replaced with an elastomeric cup positioned over the front portion of the piston and defined by a concave portion in centered position over said piston and terminating at an outer rim, and a cylindrical outer skirt extending rearward from the elastomeric rim to a terminal edge outboard the piston. This new elastomeric cup is easier to handle, lasts longer and may be more easily exchanged with other elastomeric cups, having different sized concave center portions, to handle different-sized fruits.

Over the years, advances in horticulture and chemical fertilizer have taken place to where fruits have been developed to maximize their juice content. This has also caused an increase the amount of peel oil contained in the rind. While the apparatus disclosed in our previous patent and the method of using the apparatus worked well with the peel oil content of previous fruits, these new fruits have so much oil in their peel that some of it leaks passed the ejector and contaminates the juice. This has resulted in the requirement of additional cleaning of the ejector to rid it of peel oil; such an additional step has resulted in a lower output for the machine and somewhat higher labor costs.

A plurality of grooves have been formed in the outer elastomeric cover of the ram head in an effort to provide a rearward flow path for the peel oil expressed from the rind during the compression step. However, these grooves did not provide the expected relief and the oil problem has continued and the juice production rate remains somewhat low because of the added step of wiping the piston down between cycles. Where the wiping is eliminated to keep production rates high, the machine is adjusted to provide less stroke to the piston to relieve pressure on the rind so that less oil was expressed. This results in less juice being extracted from each fruit and a higher material or feed cost.

SUMMARY OF THE INVENTION

This invention involves the discovery that by providing at least one small groove in the cylindrical outer skirt, that begins at the outer elastomeric rim and extends rearward along the outer surface of the skirt and that terminates before or short of the skirt's terminal edge, causes an extremely high degree of peel oil separation from the expressed juice. While the complete mechanism is not fully understood, it appears that this groove, or more preferably a plurality of them located equidistantally about the outer skirt, provide a reservoir for receipt of the peel oil and that becomes slightly pressurized as the elastomeric cup is forced into the squeeze block. The air and juice flowing into the grooves is squeezed into a small and smaller area. Upon withdrawal of the cup containing the fruit from the squeezing head, the peel oil is forcibly expressed from the grooves by the release of pressure and runs down the outside of the skirt to drip into the same receptacle in which the squeezed rinds are collected. This was quite unexpected, especially when the older model of elastomeric head had a plurality of grooves formed therein that extended all the way to the terminal edge. These full length grooves did not separate the peel oil from the juice with the efficiency of these new snorter grooves. The result is a higher separation rate of peel oil from the extracted juice and a higher production rate of juice from the machine.

Accordingly, the main object of this invention is an apparatus for achieving greater separation of the peel or rind oil from the juice that is squeezed from fruit. Other objects include means for increasing the production rate of juice from certain juice-squeezing apparatus, a means of handling squeezable fruit in such a manner that the peel oil is shielded from the stream of juice as it is expressed from the meat of the fruit so that there is less bitterness in the collected juice; and a means of preventing leakage of peel oil from the rind into the juice so as to maximize the desirable aroma and the taste of the collected juice.

These and other objects of the invention will become more apparent when reading the Description of the Preferred Embodiment when taken together with the Drawings appended hereto. The scope of protection sought by the inventor may be gleaned from a fair reading of the claims that conclude this specification.

DESCRIPTION OF THE PREFERRED EMBODIMENT

Figure 1:
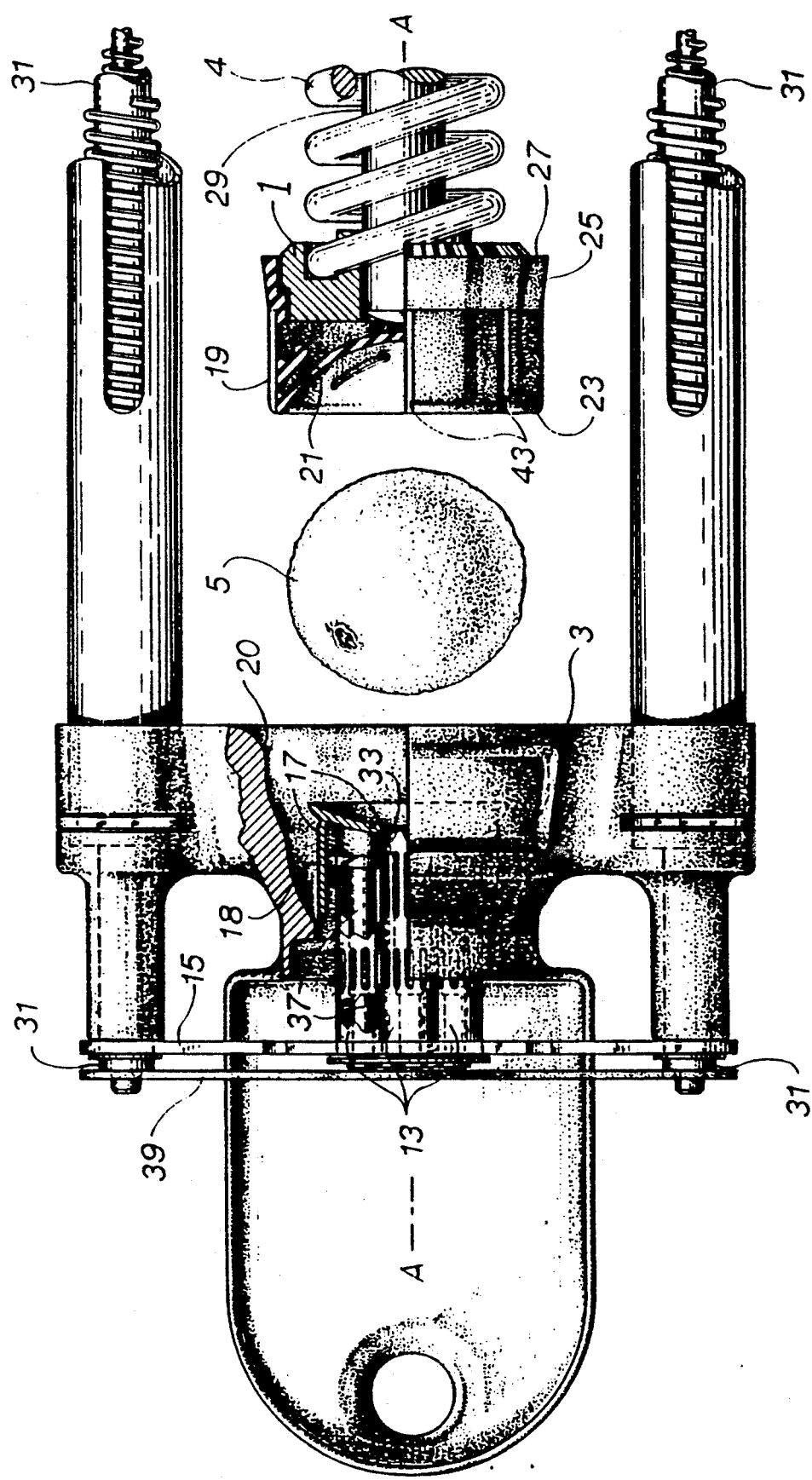
FIG. 1 is a top plan view, partly in section, of the general apparatus used to squeeze fruit wherein this invention is operable.

The apparatus for which this inventive improvement is applicable is of the type generally shown in FIG. 1 and is an apparatus for extracting the juice from whole fruit having a rind, comprising a piston 1 that is spaced-apart from a pressing head 3 and aligned axially along a central axis A—A therewith. Piston 1 is driven by a coiled spring 4 to advance towards pressing head 3 and capture a piece of fruit 5 therebetween.

Figure 2:
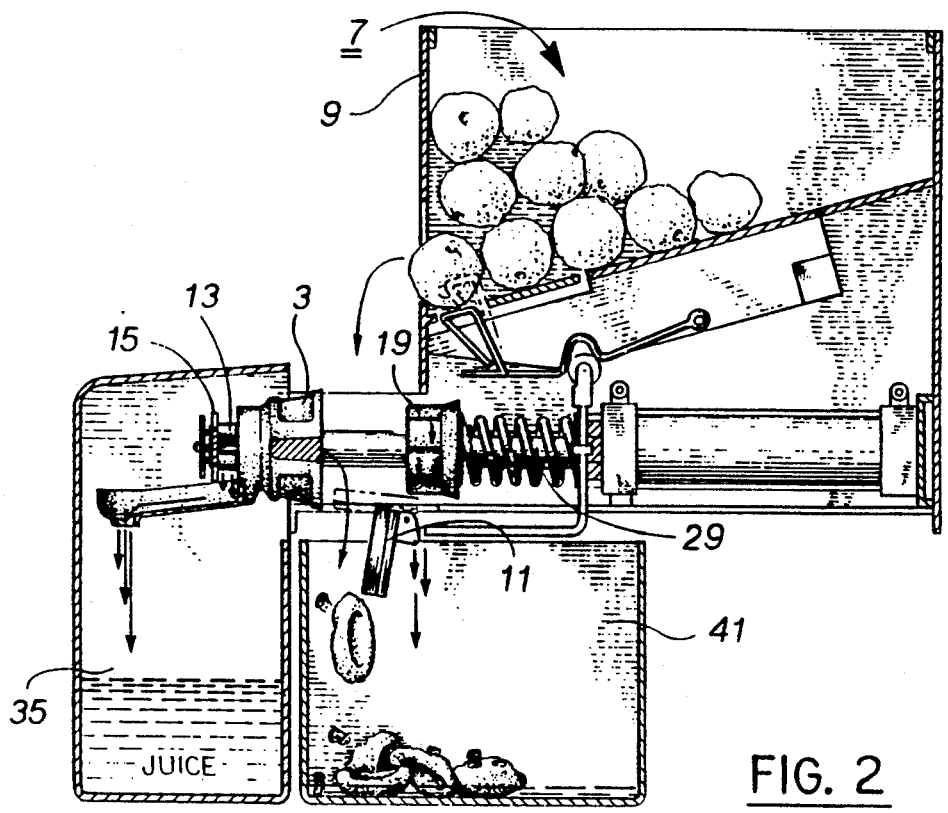
FIG. 2 is a side elevation view, partly in section, of the overall apparatus shown in FIG. 1.
Figures 3, 3A:
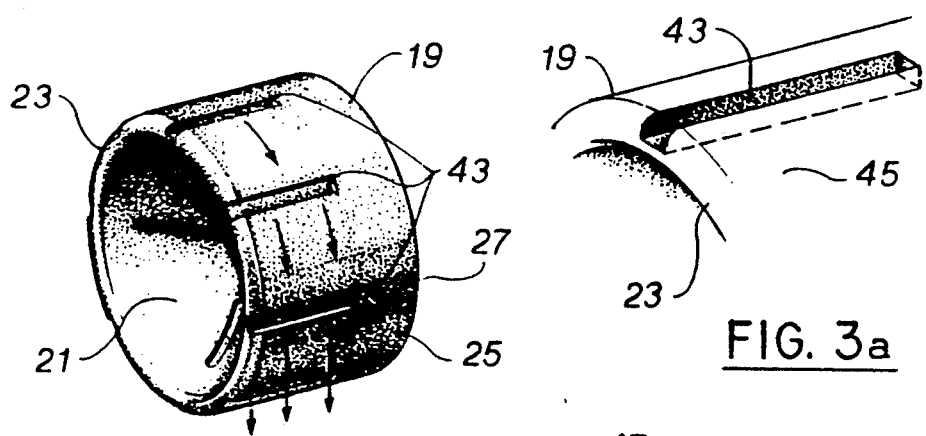
FIG. 3 is a perspective view of one embodiment of the elastomeric head of this invention.
FIG. 3a is a close-up view of the groove and the rim of the elastomeric head shown in FIG. 3; and, FIG. 4 is a perspective view of another embodiment of the elastomeric head of this invention.
Figure 4:
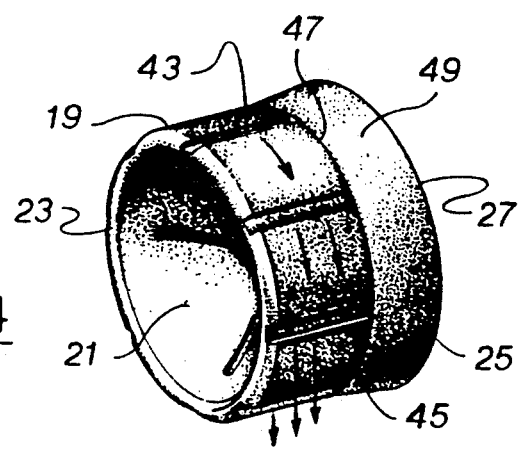

As shown in FIG. 2, means 7, including a hopper 9, is arranged in cooperation with piston 1 to drop one piece of fruit onto a trap 11 for positioning between piston 1 and pressing head 3. At least one, but preferably three, tubular coring knives 13 are mounted on a header 15 and arranged to pass through apertures 17, formed in a cylindrical manifold 18 carried in pressing head 3, for advancing into the piece of fruit and cut cores therein in preparation of collecting the extracted juice separated from the rind. An elastomeric head 19 is positioned over the front portion of piston 1 and is defined, as shown in FIGS. 1, 3 and 4, by a circular concave portion 21 positioned centrally over piston 1, extending uniformly forward about the circumferential edge to an outer rim 23. A cylindrical outer elastomeric skirt 25 extends from rim 23 rearward along the outside of piston 1 to a terminal edge 27.

In the general operation of the apparatus, piston 1 is driven toward pressing head 3, capturing the fruit therebetween and in particular in concave center portion 21. Further advance by piston 1 causes elastomeric head 19 to enter an area of an inwardly turned flange 20 in pressing head 3 that squeezes head 19 into a smaller area. Continued advance of piston 1 and elastomeric head 19 toward the fruit causes manifold 18 to move rearward a short distance allowing coring knives 13 to penetrate the fruit rind at the forward area of the fruit, but stopping short of the rind at the rear of the fruit.

Pressing head 3 thereafter stops its rearward movement and a ram 29, slidingly carried in piston 1, is urged forward under hydraulic pressure against cup center portion 21 to evert elastomeric head 19 against the fruit and squeeze the fruit against pressing head 3. Simultaneously, coring knives 13 are moved rearward under hydraulic pressure through a set of spaced-apart guide posts 31 to keep them clear of the advancing rear rind of the fruit.

The squeezed juice flows out of the fruit into coring knives 13, out of knives 13 through a series of perforations 33 formed in the walls of knives 13 and thence downward into a juice container 35. Following the squeezing step, piston 1 and ram 29 move rearward and simultaneously small ejector pins 37 carried by a depressor cross-head 39 extend through the center of coring knives 13 to push the collapsed fruit rind away from pressing head 3 so that it drops clear of knives 13 down into a bin 41 that is separate from juice container 35.

The improvement of this invention is the formation of at least one but preferably a series of grooves 43 in the outer surface of skirt 25 of elastomeric head 19. It is extremely important that these grooves not extend the full length of the cup skirt portion but begin at outer rim 23, extend rearward in a parallel direction along axis A—A and stop short of terminal edge 27 of elastomeric head 19. It is important that grooves 43 begin at outer rim 23 and further terminate short of terminal edge 27.

While not fully understood, it is believed that the structure of grooves 43 in accordance with the teachings of this invention provide an enclosed reservoir for receipt of peel oil expressed from the rind of the fruit that leak from the rind portion having the sharpest curvature or the smallest radius of curvature during the pressure-squeezing operation. This would occur around circumferential outer rim 23 and the location of grooves 43 allow the expressed peel oil to enter the grooves and travel rearward therein along skirt 25, away from the juice-expressing operation taking place in concave center portion 25. Because grooves 43 are filled with air at the beginning of the squeezing operation, and elastomeric head 19 is circumferentially squeezed as it enters inwardly turned flange 20 in pressure head 3, it is speculated that the air is compressed along with the peel oil in grooves 43 and this compressed air aids in forcing the peel oil out of the grooves 43 and downward along and around skirt portion 25 to drip into bin 41 along with the rinds and cores.

While one groove 43 will perform adequately, it has been found that for best results, four such grooves are better formed in skirt portion 25 equidistant there about. The cross-section of grooves 43 is best square with the sides of the groove being parallel and spaced apart on opposite sides of a groove bottom surface. However, there is no reason to suspect that rounded groove walls and floor or converging walls will not work just as well.

In another embodiment of this invention shown in FIG. 4, skirt portion 25 is separated into a cylindrical sleeve portion 45 extending rearward from outer rim 23 and terminating at an annular crease 47 spaced apart from and parallel to rim 23. Thereafter an outwardly extending flared smooth portion 49 extends from crease 47 further rearward to terminal edge 27. Grooves 43 are purposely designed to stop at annular crease 47. This appears to provide additional sealing to piston 1 and facilitates the capture and removal of peel oil separate from the juice that is collected in juice container 35.

While the invention has been described with reference to a particular embodiments hereof, those skilled in the art will De able to make various modifications to the described embodiments without departing from the true spirit and scope thereof. It is intended that all combinations of elements and steps which perform substantially the same function in substantially the same way to achieve substantially the same results are within the scope of this invention.

What is claimed is:

1. In an apparatus for extracting the juice from whole fruit having a rind comprising axially aligned, spaced-apart piston and pressing head arranged to move reciprocally toward and away from each other, means for loading a fruit therebetween, at least one perforated coring knife slidingly received in said pressing head for advancing into the fruit in preparation of collecting the extracted juice separate from the rind, and including an elastomeric head positioned over the front portion of said piston, defined by a circular concave portion centered over said piston and extending forward about its circumferencial edge an upstanding rim, and a skirt portion extending from said rim rearward along the outside of said piston to a terminal edge, wherein a ram, slidingly carried in said piston is hydraulically driven to advance beyond said piston to avert said center portion of said elastomeric head against said fruit during compression of the fruit between the ram and the pressing head, the improvement comprising at least one groove formed in said skirt portion of said elastomeric head beginning at said rim extending rearward along the outside of said skirt portion and terminating short of said terminal edge to provide an enclosed reservoir for receipt of peel oil expressed from the fruit during the squeezing operation for later disposal separate from said juice.

2. The improvement of claim 1 including a plurality of said grooves arranged equidistant about said skirt portion of said elastomeric head.

3. The improvement of claim 1 including four grooves arranged equidistant about said skirt portion of said elastomeric head.

4. The improvement of claim 1, wherein said groove is defined by spaced-apart flat parallel side walls separated by a flat bottom floor.

5. In an apparatus for extracting the juice from whole fruit having a rind comprising axially aligned, spaced-apart piston and pressing head arranged to move reciprocally toward and away from each other, means for loading a fruit therebetween, at least one perforated coring knife slidingly received in said pressing head for advancing into the fruit in preparation of collecting the extracted juice separate from the rind, and including an elastomeric head positioned over the front portion of said piston, defined by a circular concave portion centered over said piston and extending forward about its circumferential edge an upstanding rim, a sleeve portion extending from said rim rearward along the outside of said piston to an annular crease, and a rearwardly extending skirt portion flaring outward from said piston to a terminal edge, rearward thereof, wherein a ram, slidingly carried in said piston is hydraulically driven to advance beyond said piston to avert said center portion of said center portion of said elastomeric head against said fruit during compression of the fruit between the ram and the pressing head, the improvement comprising at least one groove formed in said sleeve portion of said elastomeric head beginning at said rim and terminating at said annular crease to provide an enclosed reservoir for receipt of peel oil expressed from the fruit and for later drainage separate from said juice.

6. The improvement of claim 5 wherein a plurality of said grooves arranged equidistant about said sleeve portion of said elastomeric head.

7. The improvement of claim 5 including four grooves arranged equidistant about said sleeve portion of said elastomeric head.

8. The improvement of claim 5, wherein said groove is defined by spaced-apart flat parallel side walls separated by a flat bottom floor.

* * * * *